United States Patent [19]
Timbs

[11] Patent Number: 5,809,025
[45] Date of Patent: Sep. 15, 1998

[54] VIRTUAL PATH-BASED STATIC ROUTING

[75] Inventor: Jeffrey L. Timbs, Keller, Tex.

[73] Assignee: Motorola, Inc., Schaumburg, Ill.

[21] Appl. No.: 616,845

[22] Filed: Mar. 15, 1996

[51] Int. Cl.[6] .............................. H04L 12/28; H04L 12/56
[52] U.S. Cl. ............................................................. 370/400
[58] Field of Search ................................... 370/395, 396, 370/397, 399, 408, 409, 400, 401, 389

[56] References Cited

U.S. PATENT DOCUMENTS

| | | |
|---|---|---|
| 5,363,369 | 11/1994 | Hemmady et al. . |
| 5,406,550 | 4/1995 | Motittin ..................................... 370/397 |
| 5,414,704 | 5/1995 | Spinney . |
| 5,440,547 | 8/1995 | Easki et al. .............................. 370/397 |
| 5,452,293 | 9/1995 | Wilkinson et al. . |
| 5,452,296 | 9/1995 | Shimizu . |
| 5,453,979 | 9/1995 | Schibler et al. . |

OTHER PUBLICATIONS

CellBus Technical Manual and CUBIT Applications, Tran-Switch Corporation, Ed. 2, Jul. 31, 1995.
CUBIT Device, CellBus Switch, TranSwitch Corporation, Ed.2, Aug. 1995.
"ATM Theory and Application" by D. McDysan et al, 1995 pp. 198–211.

*Primary Examiner*—Ajit Patel
*Attorney, Agent, or Firm*—Bruce Terry

[57] ABSTRACT

A communications system including a cell-based switching system for routing a data stream between a source node and a destination node. A data stream is received at the source node, which performs a first type of address translation to identify a first portion of the path between the source node and destination node. The data stream is sent to the first portion of the path and received by at least one intermediate node that performs a second type of address translation to identify another portion of the path between the source node and destination node. In response to receiving the data stream at the destination node, the first type of address translation is performed to identify a target within the destination node for the data stream.

8 Claims, 10 Drawing Sheets

   
   
   
*FIG.3*
  
   
 
*FIG.5*

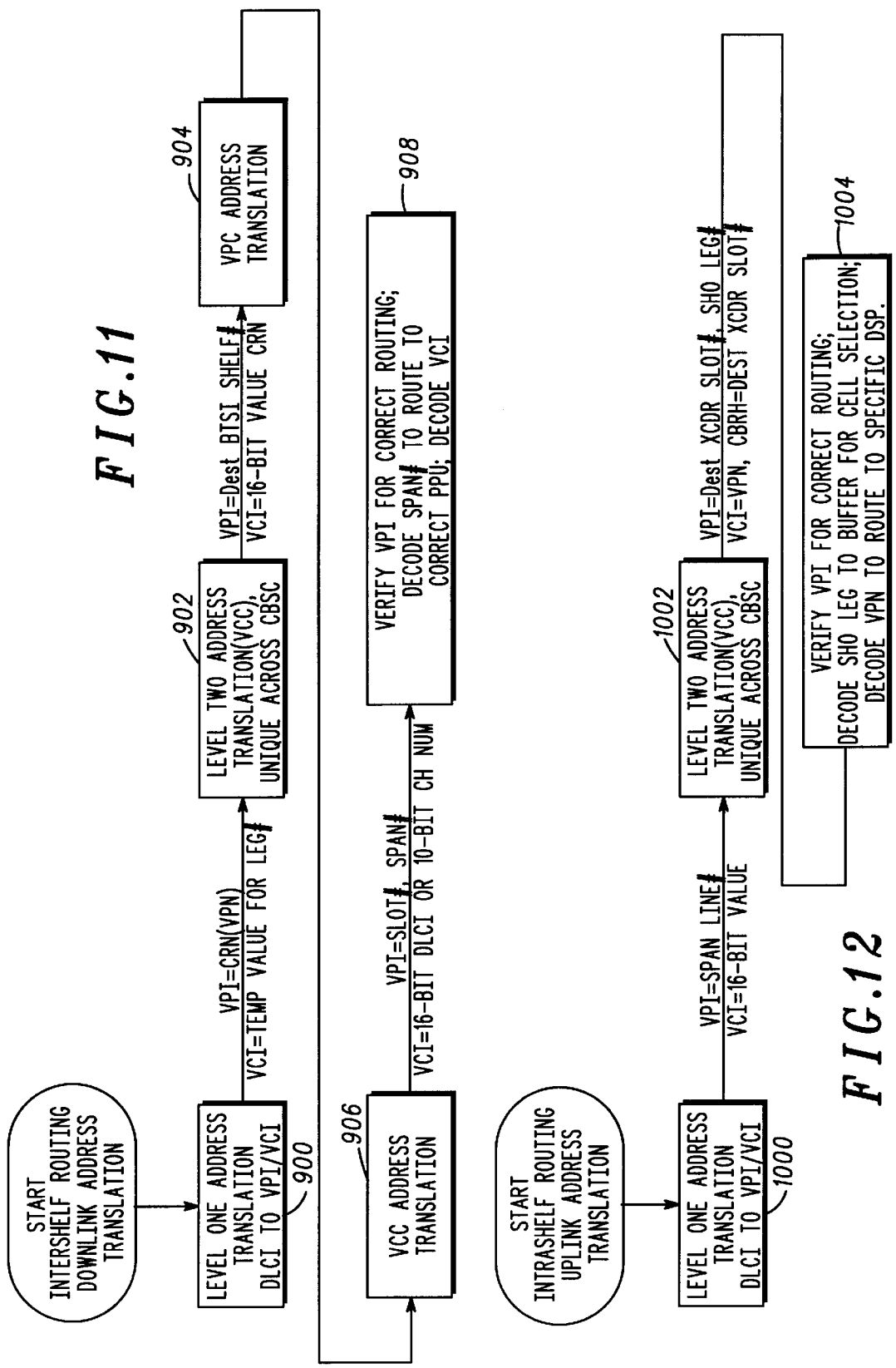

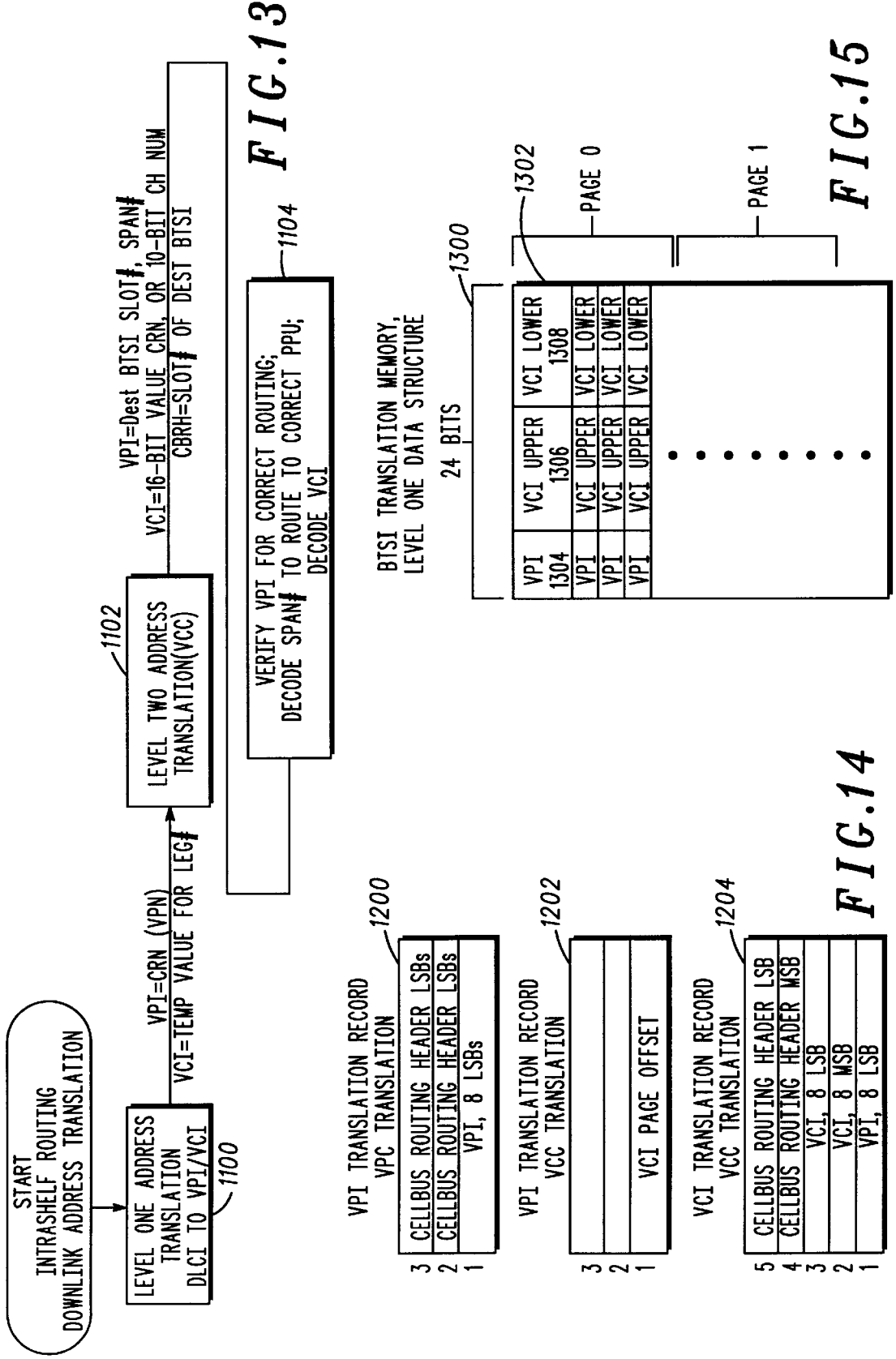

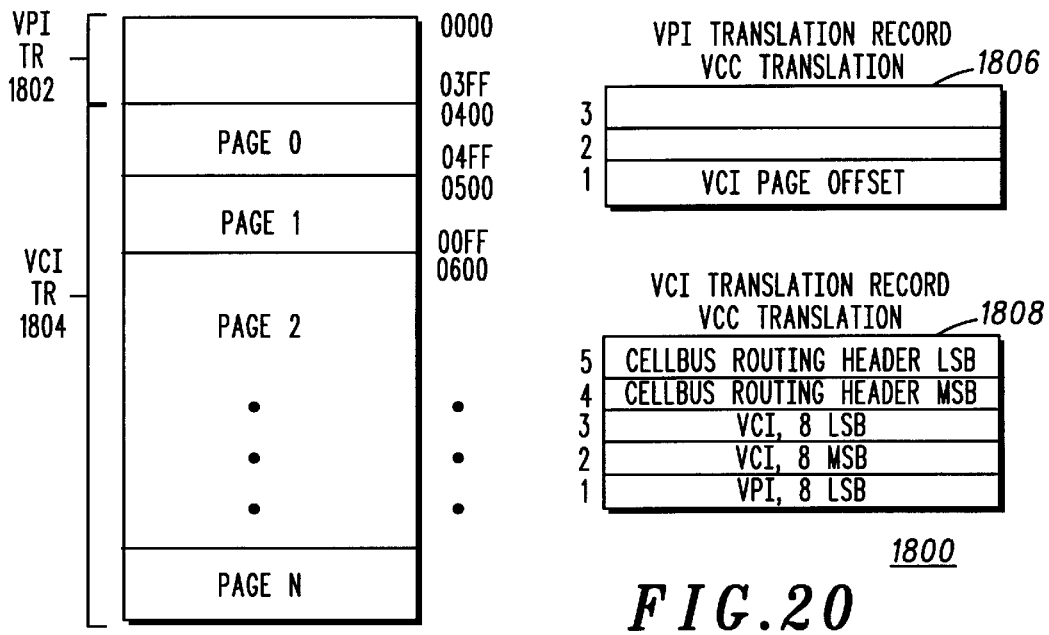
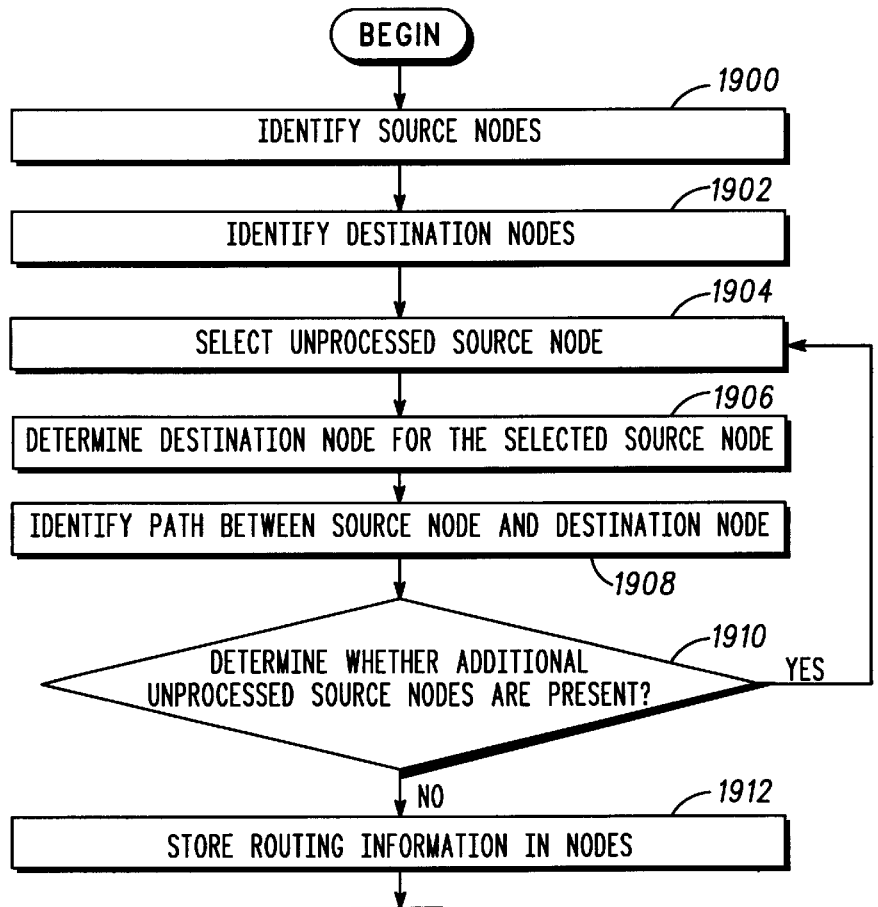
FIG.20
FIG.21 ns system.
VIRTUAL PATH-BASED STATIC ROUTING

FIELD OF THE INVENTION

The present invention relates generally to a communications system, and more particularly, to a method and apparatus for routing data within the communications system. Still more particularly, the present invention relates to a method and apparatus for routing cells from a source node to a destination node within a communications system.

BACKGROUND OF THE INVENTION

In a conventional telecommunications switching network, a communications path must be established between a source and a destination before data, such as facsimile, e-mail, or voice, can be distributed along the established path. A propagation delay occurs across the network when setting up and releasing a communications path. Conventional telecommunications switching systems, upon deriving a destination of a telephone call, must send a message to a remote database system to request routing information for a particular call. Remote database systems provide a menu of routing information, and routing information is selected from the database system according to the request from a telecommunications switching system. Conventional telecommunications switching systems, however, do not have the capability to locally generate routing information in response to a call containing asynchronous transfer mode (ATM) cells.

Cell relay technology involving ATM cells in an ATM communications system is becoming the method of choice for communications systems. Such networks may carry a wide variety of traffic types from different applications such as, data, voice, image, and video.

In moving information between nodes in an efficient manner using as few shared resources as possible, tradeoffs are made in consideration of the best route due to varying operating conditions along routes (i.e., multiple paths existing between node pairs), the amount of control overhead which must be moved throughout the system to broadcast the route selection (and the additional overhead resulting in the shared transmission path), and the resource allocation for setting-up and clearing the system resources at the beginning and the end of a call. Various approaches have been employed to achieve high throughput and minimal delay in cell switching systems. These approaches have included utilizing a portion of the cell's payload to contain the return address. This approach, however, requires a centralized system where address cells are sent to a router mechanism for registering sessions.

Other prior art approaches include employing a route setup cell and a route tear-down cell to establish and release a connection path between various nodes. In this type of system, a switching model generates a route setup cell that includes a virtual circuit identifier, identifying the connection path for these cells along a dedicated virtual circuit to an intermediate broadband switching module with the data cells being transmitted immediately following the route setup cell, but before acknowledgment of the connection is received. Such an approach for shorter messages, which is an approach typical of facsimile transmissions, e-mail, and voice, may take longer to establish the connection path than to actually send the message.

It is, therefore, desirable to have an improved telecommunications switching system that locally generates routing information for cell processing with reduced overhead and connection time.

BRIEF DESCRIPTION OF THE DRAWINGS

FIG. 3 is a diagram of shelves within a central-based site controller (CBSC) depicted according to the present invention.

FIG. 5 is a block diagram of interframe connections according to the present invention.

FIG. 11 is a flowchart of downlink address translations involving intershelf routing between a transcoder and a BTSI according to the present invention.

FIG. 12 depicts a flowchart of uplink address translations involving intrashelf routing between a BTSI and a transcoder according to the present invention.

FIG. 13 is a flowchart of downlink address translations involving intrashelf routing between a transcoder and a BTSI according to the present invention.

FIG. 14 depicts a diagram of record formats found in translational random access memories (TRAMs) used for address translations according to the present invention.

FIG. 15 is a block diagram of a data structure in a TRAM associated with a packet processing unit (PPU) in a base termination site interface (BTSI) according to the present invention.

FIG. 20 is a block diagram of a data structure in a BID-Z TRAM located in a BTC according to the present invention.

FIG. 21 depicts a flowchart for setting up paths within a CBSC according to the present invention.

DETAILED DESCRIPTION OF A PREFERRED EMBODIMENT

The present invention provides a method and apparatus for near-static routing of a data stream between a source node and a destination node with minimal requirements of shared resources. The architecture of the present invention provides flexible routing of a data stream received at a source node and minimizing the use of centralized resources resulting in faster call set-up and clearing. According to the present invention, a path for routing cells is setup at the source node. Any intermediate nodes along the path between the source node and the destination node are not required to select a path to route cells in the switching system. Each intermediate node contains the information necessary to route a cell to the next node based on the path selected by the source node. Additionally, management of the network topology changes are easily handled and is extensible for increasing numbers of destination nodes. According to the present invention, paths are identified between source nodes and destination nodes prior to the switching system being employed for routing calls. As a result, information within intermediate nodes does not require updating because no per-call internode setup is required to identify paths.

Figure 1:
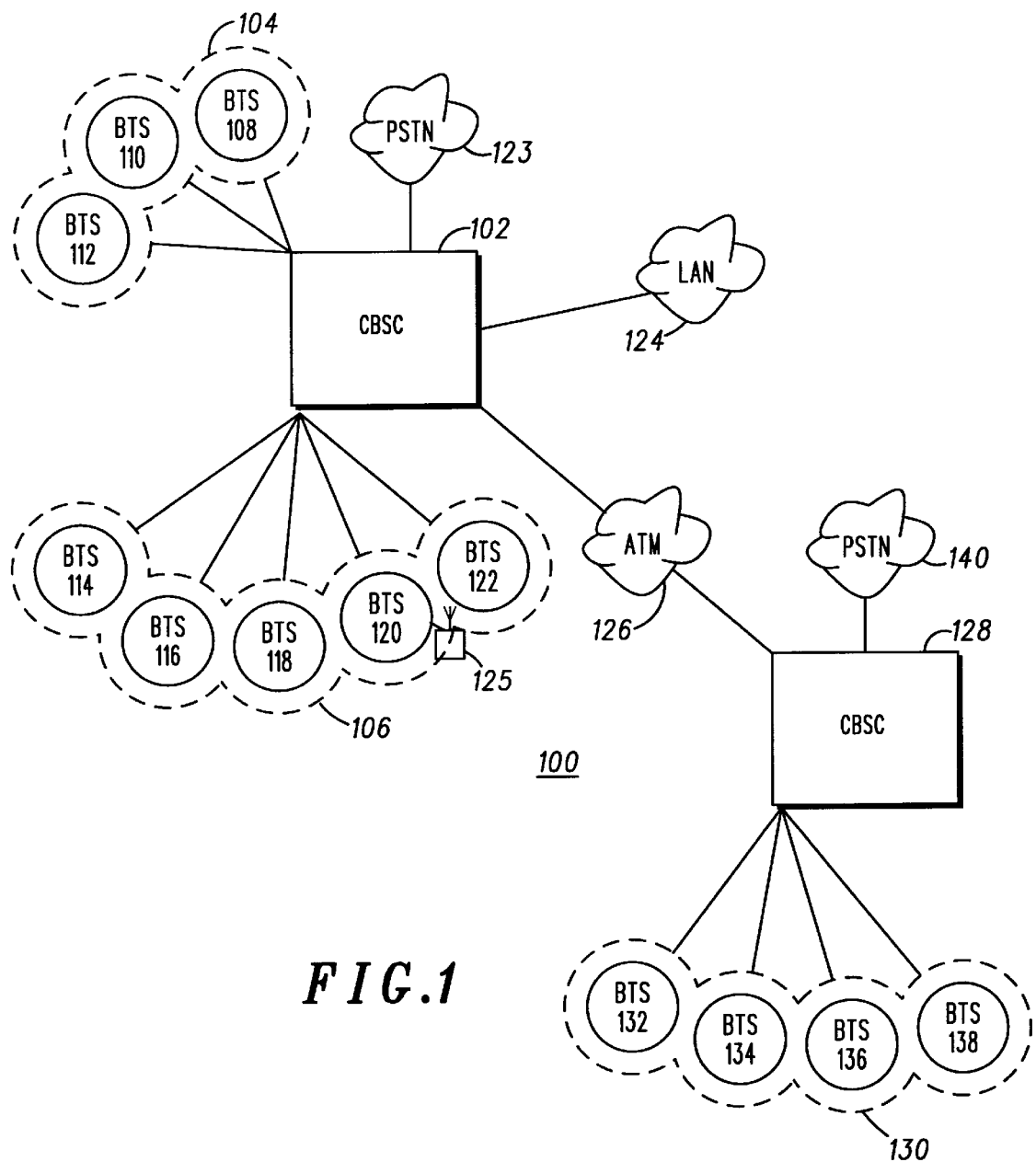
FIG. 1 is a diagram of a communications system according to the present invention.

With reference now to the figures, and in particular with reference to FIG. 1, a communications system 100 is depicted in which the present invention may be implemented. Communications system 100 includes a central-based site controller (CBSC) 102, which in the depicted example, is a cell-based switching system for processing data streams from various sources, such as voice, data, image, and video. CBSC 102 receives and sends data to and from cellular regions 104 and 106. Cellular region 104 includes base termination sites (BTSs) 108–112, which send and receive radio signals to and from mobile telephones and packetize the communications content of the radio signals into electronic data transported within data packet units. The BTSs may receive synchronous or asynchronous data transmissions. The packets are sent to CBSC 102 over the span lines connecting BTSs 108–112. These span lines may be T1 or E1 lines connecting the BTSs to CBSC 102. Similarly, cellular region 106 contains BTSs 114–122, which also receive radio signals, packetize these signals into data packet units and send the data packet units to CBSC 102 over the span lines connecting BTSs 114–122 to CBSC 102.

Data can be sent to mobile telephone units, such as mobile unit 125, from CBSC 102 through transmissions from BTSs located in each of the cellular regions. A mobile unit 125 traveling within cellular region 106 transmits radio signals for a call that may be received by more than one BTS, such as BTS 122 and 120. Each BTS receiving a radio signal from mobile unit 125 will transmit data to CBSC 102, via the span lines. At some point, only one of the two BTSs will receive radio signals from the mobile unit 125 because the mobile unit 125 will have traveled out of the range of that BTS. Similarly, a mobile unit may receive a radio signal from more than one BTS depending on the location of mobile unit 125. This receiving of radio signals at multiple BTSs for a single call is associated with soft hand-offs (SHOs) within CBSC 102, as later described. CBSC 102 receives the packetized data at a source node and transforms the packet data units into asynchronous transmission mode (ATM) cells for transfer to a destination node, which may lead to various destinations, such as public switched telephone network (PSTN) 123 and local area network (LAN) 124.

CBSC 102 also is connected to ATM network 126, which is in turn connected to CBSC 128. Like CBSC 102, CBSC 128 receives radio signals in cellular region 130 from BTSs 132–138. CBSC 128 also provides a connection to PSTN 140.

Figure 2:
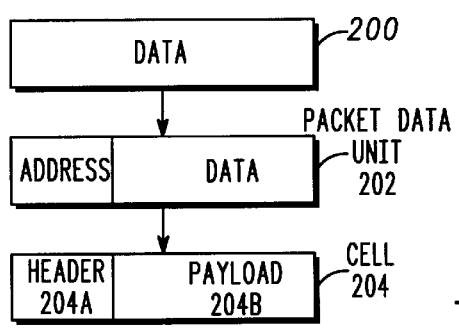
FIG. 2 depicts a block diagram of data structures according to the present invention used to transfer data within a communications system as shown in FIG. 1.

With reference now to FIG. 2, a block diagram of data structures used to transfer data in communications system 100 in FIG. 1 is depicted according to the present invention. Packet 200 is an electronic data packet in the form of a code division multiple access (CDMA) packet received within one of the BTSs shown in FIG. 1, such as BTS 118. Packet 200 includes voice data associated with CDMA. When received at BTS 118, packet 200 is transformed into a packet data unit (PDU) 202. PDU 202 is sent to CBSC 102 along a span line and converted into a cell within CBSC 102. PDU 202 may be in any format known in the art, but in the depicted example, the format is frame user network interface (FUNI) for asynchronous transmissions. Any known format may be employed for synchronous transmissions. PDUs under FUNI format may come in various sizes, but the header is oriented to that of a cell. More information on FUNI is described in Frame Based User-to-Network Interface (FUNI) Specifications, af-saa-0030.000, available from the ATM Forum Technical Committee, Foster City, Calif., and incorporated by reference herein. PDU 202 is translated into a cell 204 within CBSC 102.

Cell 204 is an example of the data structure used within CBSC 102 to carry data from source nodes to destination nodes. Cell 204 includes a header portion 204a and a payload portion 204b. Header portion 204a contains information used to route the cell 204 along with other overhead information. Data is placed within payload portion 204b. The so-called data link connection identifier (DLCI) is translated into an ATM virtual path identifier (VPI) and virtual channel identifier (VCI) combination that is unique within the CBSC. In the standard ATM header, the VPI field is 8 bits long and the VCI field is 16 bits long. The ATM header also includes other control information. More information on ATM technology is described in Geralski, *Introduction to ATM Networking*, McGraw-Hill, Inc., (1995), ISBN 0-07-024043-4, and incorporated by reference herein.

With reference now to FIG. 3, a block diagram of shelves within CBSC 102 is depicted according to the present invention. In the depicted example, CBSC 102 contains 12 shelves 300–324. A typical CBSC system includes multiple shelves and frames. The shelves are grouped into frames 1–4 in the depicted example. Of course, other numbers of frames and numbers of shelves within frames may be used according to the present invention. The grouping of shelves into frames may be either logical or physical according to the present invention. These shelves are part of an internal switching mechanism used to transport data between node pairs, a source node and a destination node.

Accordingly, the present invention advantageously provides for routing between shelves (i.e., intershelf routing) to occur under the direction of static VPC-based translations, which are defined during system configuration and do not change during operation (unless the topology changes, such as adding a shelf). By contrast, routing within shelves (i.e., intrashelf routing) occurs under the direction of dynamically assigned VCC-based translations, which are defined on a per-call basis. The improvement is to dynamically allocate only source and destination translations, while the transit routing resources (between source and destination nodes) are set-up during provisioning and are static during system operation. Thus, the effort to route a call is reduced through the minimization of the amount of control messages and centralized resources that must be sent to set up the call at the time the call request is issued. For example, data received at a BTS is relayed to a BTS interface (BTSI) via a span line. The data is placed into a cell at the BTSI and sent to a transcoder, with the BTSI being the source node and the transcoder being the destination node. A more detailed description of a BTSI and a transcoder are found below.

PDU 202 is received within one of the shelves depicted in FIG. 3 and converted into a cell 204.

Figure 4:
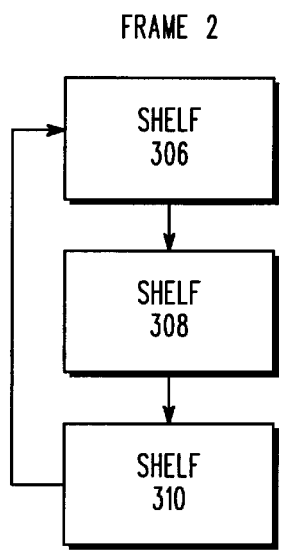
FIG. 4 is a block diagram of intraframe connections according to the present invention.

With reference now to FIG. 4, a block diagram depicting intraframe connections is illustrated according to the present invention. As can be seen, shelves 306, 308, and 310 within frame 2 are connected in a ring arrangement. Cells move from shelf to shelf in a frame within this ring connection. Turning next to FIG. 5, a block diagram depicting interframe connections is illustrated according to the present invention. In FIG. 5, the shelves within frames 1–4 are interconnected with each other, such that each frame has a connection to another frame within CBSC 102. Paths using connections within a shelf are known as intrashelf paths. Paths between shelves within a frame are known as intraframe paths, while paths between shelves located in different frames are known as interframe paths. Cells are routed through the various shelves using a VPI, VCI and a slot identifier assigned at the source node. At the destination node, which may be located in the same shelf or a different shelf from the source node, the cell is recognized by the destination node based on the slot identifier appended to the header of the cell. This method and architecture for routing cells will be described in more detail below.

Figure 6:
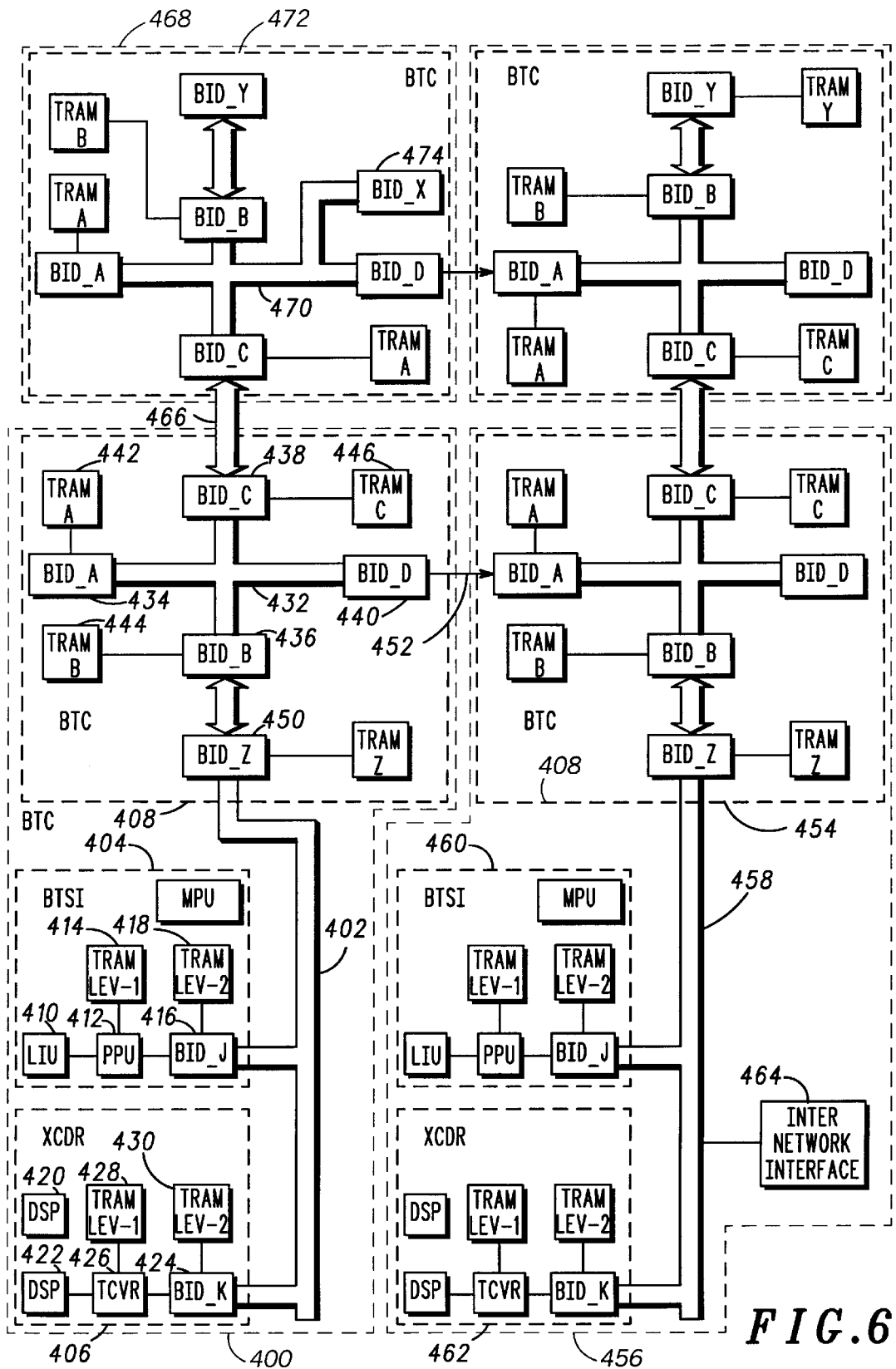
FIG. 6 depicts a more detailed block diagram of multiple shelves and frames and their interconnections according to the present invention.

With reference now to FIG. 6, a more detailed illustration of multiple shelves and frames and their interconnections is depicted according to the present invention. Within shelf 400, a cell bus 402 provides a connection between BTSI 404, transcoder 406, and bus termination card (BTC) 408. In the depicted example, BTC 408 functions as an intermediate node for cells being transported between shelves, while BTSI 404 and transcoder 406 may either be a source node or a destination node depending on the direction that the data stream is flowing. BTSI 404 includes a framer 410, which sends and receives a data stream of PDUs to and from a BTS via a span line. Framer 410 may be connected to 1–8 span lines according to the present invention. Of course, those of ordinary skill in the art will realize that other numbers of span lines may be attached to framer 410. Packet processing unit (PPU) 412 is connected to framer 410 and places data from PDUs received by framer 410 into cells for transport within CBSC 102. PPU 412 also takes cells received by BTSI 404 and converts the cells into PDUs that are sent to BTSs via framer 410.

Figure 7:
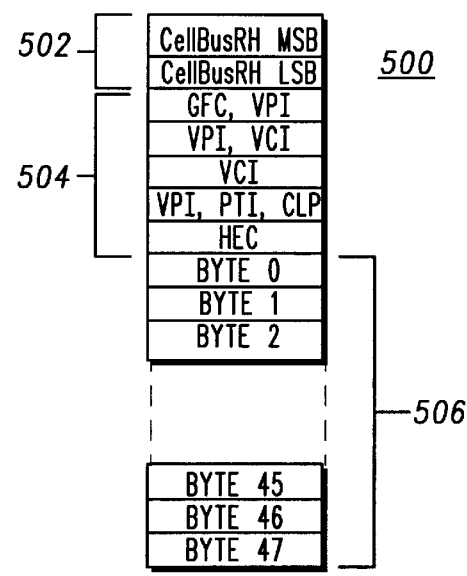
FIG. 7 is a block diagram of a cell according to the present invention.

FIG. 7 depicts a more detailed illustration of a cell according to the present invention. Cell 500 includes a cell bus routing header (CBRH) 502, header 504, and a payload 506. CBRH 502 contains routing information for bus interface devices (BIDs) within CBSC 102. Header 504 includes a generic flow control (GFC) field, VPI and VCI fields. A payload type identifier field and a cell loss priority field also are found in byte 4 of header 504. The remaining portion of cell 500 is payload 506, which contains data for transmission to a destination node. Cell 500 is a standard ATM cell except for that CBRH 502 has been appended to header 504.

Referring back to FIG. 6, in converting PDUs into cells, PPU 412 extracts an address from the PDU and uses the address to access a translation random access memory (TRAM) 414 to perform an address translation during adaptation of the PDU to a cell. The conversion of these PDUs into cells is performed using ATM adaptation layer functions under ATM adaptation layer (AAL) 5 according to a preferred embodiment of the present invention. This address translation is also called a level one address translation. This level one address translation is a logical-to-logical mapping with the resulting information being used to form a cell header. When cells are converted to PDUs, PPU 412 extracts a channel number and a link number from the VCI in the cell header. The channel number and the link number along with the data in the payload of the cell are used to form a PDU.

BTSI 404 also includes a BID-J 416 connected to PPU 412. BID-J 416 provides an interface to cell bus 402. TRAM 418 is used by BID-J 416 to perform a second address translation, also called a level two address translation, when a cell is passed to BID-J 416 by PPU 412. This level two address translation is a virtual channel connection (VCC) address translation that replaces the original VPI and VCI with new ones in which the new VPI corresponds to a destination shelf identification and the VCI corresponds either to a call reference number (CRN) that is a logical identifier for the call or to an identifier for a device (also called a target) such as a DSP. A CRN is used in the VCI when the cell is to be routed along an intershelf or interframe path to a destination node. An identifier for a device is employed in the VCI when the cell is to be sent on an intrashelf path to the destination node.

The level one address translation provides a VPI and VCI that are unique only within the BTSI 404. According to the present invention, level one address translations are used at the BTSIs and transcoders because the BIDs within these nodes require cells as inputs (i.e., the connections to the BIDs utilize buses under Utopia standards). More information on Utopia standards may be found in Utopia Level 2, V1.0, af-phy-0039.000 available from the ATM Forum Technical Committee in Foster City, Calif., and incorporated by reference herein. Additional information on Utopia standards may be found in Utopia Level 1, which is also available from the ATM Forum Technical Committee.

The level two address translation in the source node, BTSI 404, results in a VPI and VCI that is unique across the entire CBSC, identifying the particular shelf and device. In the case where the destination node is a transcoder, the VCI is a CRN that is used to identify a digital signal processor (DSP) that has been assigned for voice processing. Additionally, a cell bus routing header (CBRH) is added that corresponds to the slot identification of the next node in the path to the destination node. This CBRH is appended to the cell header, altering from the normal length of an ATM cell according to the present invention. In the case of an intrashelf route, the CBRH corresponds to the slot identification of another card in the shelf, such as a BTSI, a transcoder, or an inter-network interface. For intershelf, intraframe, or interframe routes the slot identification is that of the BTC card. This type of address translation is a logical to physical mapping of numbers. In a preferred embodiment, BID-J 416 only performs an address translation when placing a cell onto cell bus 402. No address translations are performed on cells removed from cell bus 402 by BID-J 416 for processing by PPU 412.

As shown in FIG. 6, transcoder 406 includes DSPs 420 and 422, which place data received by transcoder 406 into a format for use within a PSTN. Transcoder 406 receives cells at BID-K 424. BID-K 424 determines whether to remove a cell from cell bus 402 by examining the CBRH in the header of the cell from which a determination is made as to whether the slot identification is that of transcoder 406. In a preferred embodiment, time consuming address translation is not performed at BID-K 424 when removing cells from cell bus 402.

These cells are passed to transceiver 426, which extracts a DSP voice processor number (VPN) field within the VCI found in the cell header. The VCI is employed by transceiver 426 to route data to either DSP 420 or DSP 422 for voice processing. The DSP VPN field is extracted from the VCI using data stored in TRAM 428, connected to transceiver 426.

Transceiver 426 is also employed to place data received by either DSP 420 or DSP 422 into cells for transport within CBSC 102. When receiving data from one of the DSPs, transceiver 426 performs a level one address translation using TRAM 428 to assign a VPI number and a VCI number for placement in a cell header. The data is placed into the payload portion of the cell by transceiver 426. This cell is transferred to BID-K 424 for subsequent transmission onto bus 402. Prior to placing a cell onto cell bus 402, BID-K 424 performs a level two address translation using TRAM 430 to identify a destination slot number. BID-K 424 also appends a CBRH to the cell header as part of the level two address translation.

BTC 408 includes a cell bus 432 interconnecting BID-A 434, BID-B 436, BID-C 438, and BID-D 440. TRAM-A 442, TRAM-B 444, and TRAM-C 446 are connected to BID-A 434, BID-B 436, and BID-C 438, respectively. These TRAMs are used for virtual path connection (VPC) address translations in which only the VPI is included in the address translation. BID-D 440 does not have a TRAM because, in a preferred embodiment, an address translation is performed only when a cell is placed onto a cell bus. BTC 408 also contains BID-Z 450, which provides a connection to BID-B 436 and cell bus 402. Each of these BIDs are employed for routing cells to the appropriate destinations based only on the VPI in the header of the cell. Each BID determines whether a cell is to be routed by the BID based on the CBRH appended to the cell header. Again, the BTC advantageously provides static routing translations for interim routing, an improvement over the prior art.

According to the present invention, an address translation is performed only when a cell is placed onto a cell bus and each address translation provides a new CBRH that replaces the existing CBRH appended to the cell header. The slot identification number of the next node (i.e., a BTSI, a transcoder, or another BTC) is stored as the CBRH and is used to route the cell to the next node in the path to the destination node. The VPI remains the same in the address translations of these BIDs.

Intraframe ring 452 connects BTC 408 to BTC 454 in shelf 456, as shown. Cell bus 458 provides a connection between BTC 454 and BTSI 460, transcoder 462, and inter-network interface 464. Showing another type of inter-shelf connections, interconnect 466 connects shelf 400 to shelf 468, as shown. Within shelf 468, cell bus 470 in BTC 472 also includes a BID-X 474, which provides an interface to a destination outside of CBSC 102, such as, for example, LAN 124 shown in FIG. 1.

The various components within a shelf may be implemented using known devices according to the present invention. For example, the BIDs are implemented using Cubits from TranSwitch Corporation in Shelton, Connecticut. (It is noted that "Cubit" is a trademark of TranSwitch Corporation.) Cubits and their applications are described in *Cell, Bus, Technical Manual and Cubit Applications*, Document No. TXC-05801-TM1 and *Cubit Device, Cell Bus Switch, Data Sheet*, Document No. TXC-05801-MB, both available from TranSwitch Corporation in Shelton, Conn., and incorporated by reference herein. Framer 410 may be implemented using known framers, such as T7630 T1/E1 framer, available from AT&T Corp. PM4344 is a framer available from PMC-Sierra located in Burnaby, Canada. Address translation, creation of cells, and other functions of packet processing unit 412 may be implemented using an application specific integrated chip (ASIC) design.

Figure 8:
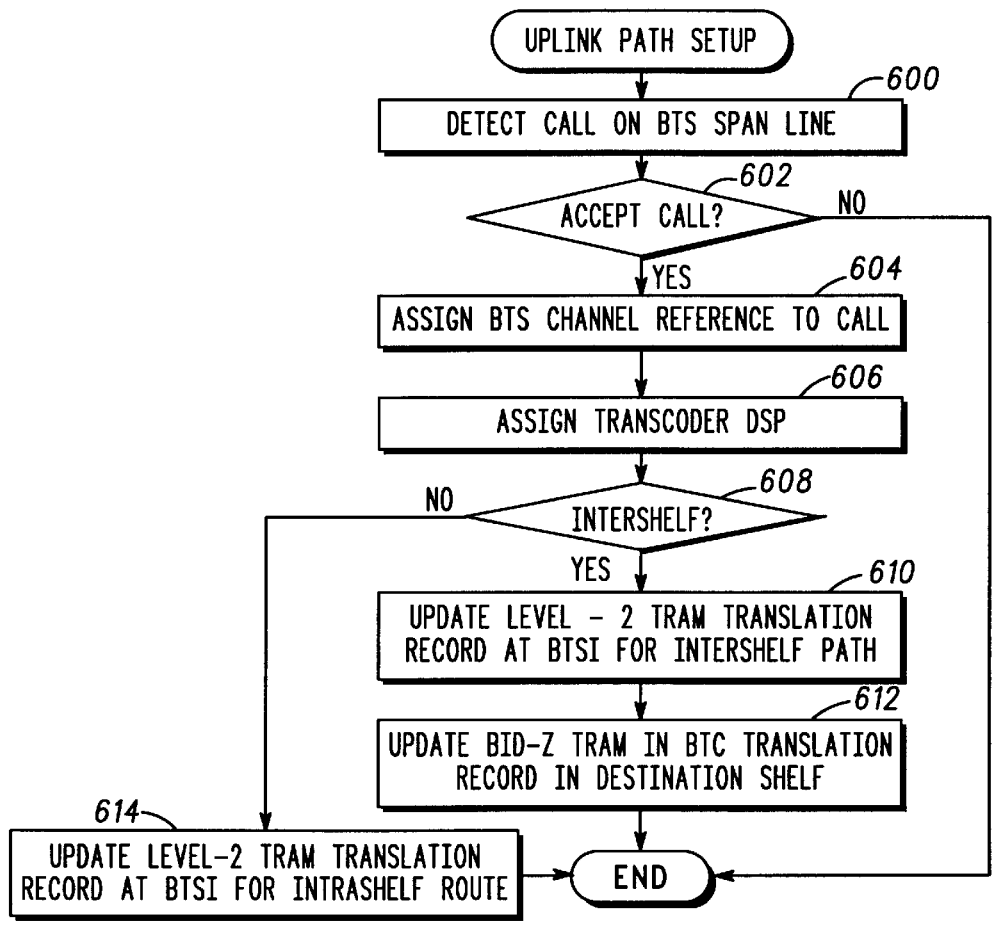
FIG. 8 depicts a flowchart of a process for dynamically setting up an uplink path according to the present invention.

With reference now to FIG. 8, a flowchart of a process for dynamically setting up an uplink path is depicted according to the present invention. The process begins by detecting an originating call on a BTS span line (step 600). The call is typically a mobile-to-land call received at a BTS, with the data being transferred to the BTSI via the span line. The process then determines whether to accept the call (step 602), e.g., whether the network has the necessary resources to set up the call. If the process does not accept the call, the process then terminates. Otherwise, a BTS channel reference number is assigned to the call (step 604). This BTS channel reference number is a DLCI or a frame address (FA). The process then assigns a transcoder DSP to process the call (step 606). The call may be setup by the BTC located on the shelf of the source node or by some centralized system according to the present invention.

Next, a determination is made as to whether the path requires data to be transported on an intershelf path (step 608). If the route requires an intershelf path, the process then updates the level two TRAM translation record (TR) at the BTSI using information for an intershelf path (step 610). This is done by setting the VPI equal to the transcoder shelf identification and the VCI to a cell routing number (CRN) that is unique within the CBSC. In the present example, the CRN is a 16 bit number. Additionally, the CBRH in the TRAM translation record is set equal to the active BTC slot number for the BTC that is to transport the cells off the shelf in which the BTSI card is located. Thereafter, the BID-Z TRAM translation record associated with the call is updated in the BTC located in the destination shelf containing the transcoder (step 610). The VPI is set equal to the slot number of the destination transcoder and the soft-hand-off (SHO) leg number (i.e., each SHO leg is an active link for a logical call). The VCI is set equal to the voice processing number of the DSP that is to process this call. The CBRH is set equal to the destination transcoder slot identification number with the process terminating thereafter.

With reference again to step 608, if the route is not an intershelf path, the process then updates the level two TRAM translation record in the BTSI for an intrashelf route (step 614). This is done by setting the VPI equal to the destination transcoder shelf identification and by placing the VPN of the DSP to process the information and the SHO leg number in the VCI. The CBRH is set equal to the transcoder slot identification number, and the process terminates.

Figure 9:
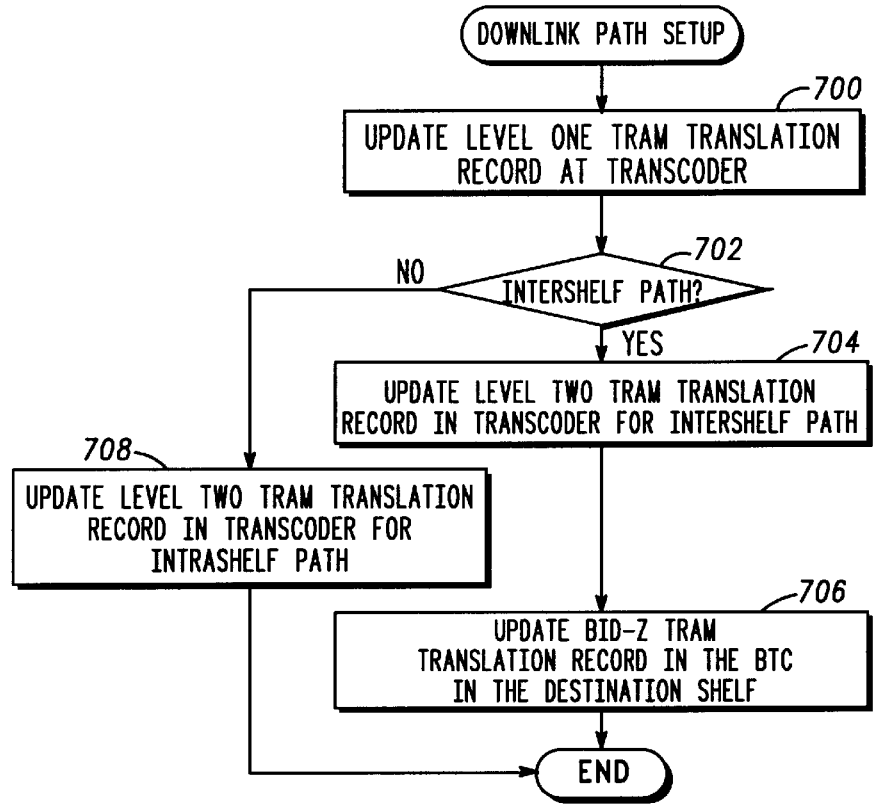
FIG. 9 is a flowchart of a process for dynamically setting up a downlink path according to the present invention.

With reference now to FIG. 9, a flowchart of a process for dynamically setting up a downlink path is depicted according to the present invention. The process begins by updating the level one TRAM translation record in the transcoder (step 700). In a preferred embodiment, this is done by setting a portion of the record equal to the active leg indicator and by assigning a temporary VCI for the SHO leg of a call reference number. A determination is made as to whether the cells will be routed along an intershelf path (step 702). If the cells are to be routed along an intershelf path, the process updates the level two TRAM translation record in the transcoder for an intershelf destination node (step 704). This is accomplished by setting the VPI equal to the destination BTSI shelf identification number and by setting the VCI to a 16 bit CRN. Additionally, the CBRH is set equal to the active BTC slot that is to transport the cells off the shelf.

The process then updates the BID-Z TRAM translation record in the destination shelf (step 706). This is done by placing the span line number and the slot identification number of the BTSI in the VPI. Additionally, the VCI is set equal to the DLCI. Alternatively, the VCI could be set equal to the logical channel number. A logical channel number is used to identify a call out of several calls being transmitted on a span line. This logical channel number is used to obtain a frame address or DLCI. The CBRH is set equal to the BTSI slot identification number with the process terminating thereafter.

With reference again to step 702, if the process requires an intrashelf path, the level two TRAM translation record in the transcoder is updated for an intrashelf destination node (step 708). The translation record is updated by placing the destination BTSI slot identification number and the span line number into the VPI portion of the translation record. The VCI contains a 16-bit CRN. The CBRH contains the slot identification number of the destination BTSI with the process terminating thereafter.

Figure 10:
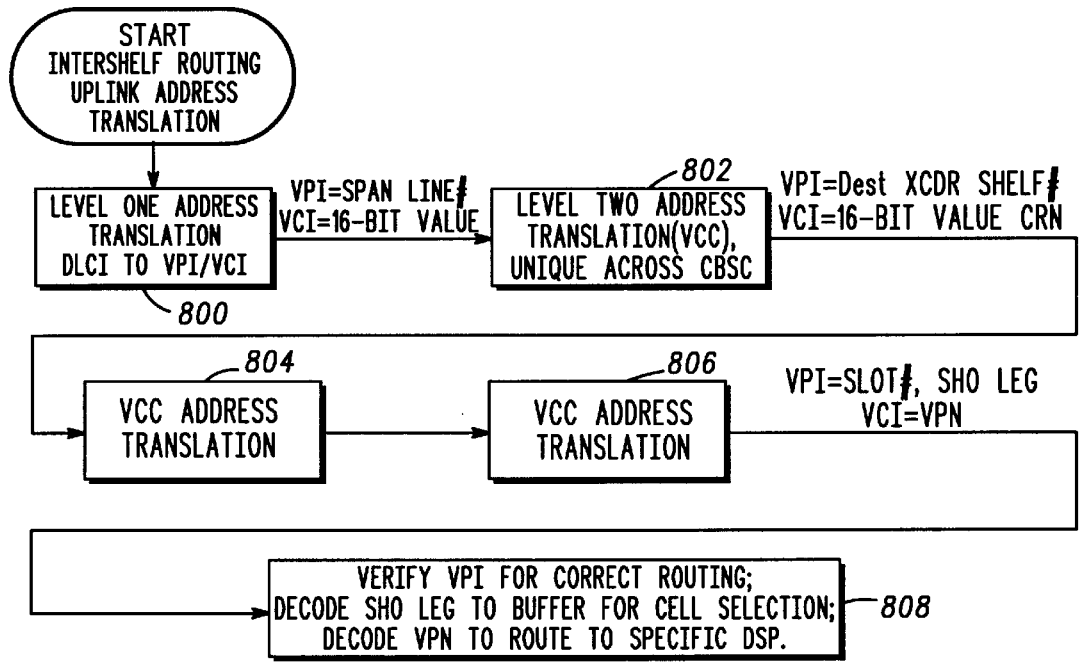
FIG. 10 depicts a flowchart of uplink address translations involving intershelf routing between a BTSI and a transcoder according to the present invention.

With reference now to FIG. 10, a flowchart of uplink address translations involving intershelf routing between a BTSI and a transcoder is depicted according to the present invention. The process begins with the BTSI (the source node) performing a level one address translation to convert a DLCI to a VPI and a VCI in response to receiving a data stream (step 800). The VPI is set equal to the span line number and the VCI is set equal to a temporary value. Next, the BTSI performs a level two translation, which is a VCC address translation (step 802). A VCC address translation involves both the VPI and the VCI while a VCC address translation involves only the VPI in a cell. This translation results in a VPI and a VCI that are unique across the CBSC and provides a CBRH. The VPI includes the destination slot identification, which is, for example, the destination transcoder shelf identification number. A portion of the VPI also may be used to encode the SHO leg number. The VCI contains a CRN that is later used to obtain the voice processing number (VPN).

Next, a VPC address translation occurs at a BTC in response to receiving a cell (step 804). The VPI is examined to identify a CBRH to direct the cell to the next node in the path to the destination transcoder. The VPI remains the same after this address translation. A VCC address translation occurs at the destination BTC in response to receiving a cell (step 806). The destination BTC is the node prior to the transcoder (the destination node) the VCC address translation at the BTC replaces the VPI in the cell header with a VPI containing the slot number of the transcoder and an identification of a SHO leg. The VCI is used to obtain the VPN and the SHO leg number, which replaces the CRN in the VCI. The CBRH is set equal to the destination transcoder slot identification number.

In response to receiving a cell, the transcoder processes the cell header to direct data in the cell payload to the appropriate DSP (step 808). In processing the cell header, the transcoder verifies correct routing of the cell by examining the VPI. Additionally, the transcoder decodes the VPI and the VCI to identify the SHO leg number to assigned buffers for cell selection. Cells are buffered from each path to the transcoder associated with a call. After all the cells are received for the different legs, a selection of the cell containing the best data is made for processing by the DSP. The VCI is used to retrieve the voice processing number (VPN), which is used to route data to a specific DSP in the transcoder. Although the depicted flowchart includes only a single BTC as an intermediate node between the BTSI (source node) and the transcoder (destination node), additional intermediate nodes may be present in which address translations such as the address translation in step 804 are performed.

Turning next to FIG. 11, a flowchart of downlink address translations involving intershelf routing between a transcoder and a BTSI is depicted according to the present invention. The process begins with the transcoder performing a level one address translation to relate voice data samples to a number of VPI and VCI pairs equal to the number of active lengths when multiple legs are active for a logical call (step 900). The VPI contains a CRN that is later used to obtain the VPN. Alternatively, the VPI can directly identify the VPN in which the VPI is the identifier for the VPN. The VCI is a temporary value for the leg number. Next, the transcoder performs a level two address translation (step 902). This translation provides an address that is unique across a CBSC. In this translation, the VPI includes the destination BTSI shelf number. The VCI contains the CRN, and the CBRH contains the slot identification number of the next node, a BTC, that is to route the cell towards the destination BTSI.

Next, a VPC address translation is performed at the BTC located on the same shelf as the transcoder (step 904). This type of address translation also is performed at any additional BTCs prior to the destination BTC. At the destination BTC in the destination BTSI shelf, a VCC address translation is performed on the cell (step 906). This VCC address translation places the slot identification number of the BTSI and the span number into the VPI of the cell. The VCI in the cell is replaced with a DLCI or a channel number.

At the BTSI, the cell header is processed (step 908). In processing the cell header, the BTSI verifies that the cell was correctly routed by examining the VPI. The VCI/VPI pair is decoded to obtain the span line number and the DLCI, respectively. The DLCI may be contained by direct translation of the VCI or alternatively, the VCI may be used as a pointer to obtain the DLCI.

With reference now to FIG. 12, a flowchart of uplink address translations involving intrashelf routing between a BTSI and a transcoder is depicted according to the present invention. The process begins with the BTSI executing a level one address translation to convert a DLCI to a VPI and a VCI (step 1000). The VPI is set equal to the span line number and the VCI is set equal to a temporary value. Next, the BTSI performs a level two translation, which is a VCC translation (step 1002). This translation results in a VPI and a VCI that are unique across the CBSC and generates a CBRH. The VPI includes the destination slot identification, which is for example the destination transcoder slot identification number. A portion of the VPI also may be used to encode the SHO leg number. The SHO leg number identifies one of a number of active links for a logical call. The VCI contains the voice processing number and also may include information identifying a SHO leg number. The CBRH is set equal to the destination transcoder slot identification number.

The transcoder processes the cell header to direct data in the cell payload to the appropriate DSP (step 1004). In processing the cell header, the transcoder verifies correct routing of the cell by examining the VPI. Additionally, the transcoder decodes the VPI and the VCI to identify the SHO leg number to assigned buffers for cell selection. The VCI is used to retrieve the voice processing number (VPN), which is used to route data to a specific DSP in the transcoder.

Turning next to FIG. 13, a flowchart of downlink address translations involving intrashelf routing between a transcoder and a BTSI is depicted according to the present invention. The process begins with the transcoder performing a level one address translation to convert a DLCI to a VPI and a VCI (step 1100). The VPI is a CRN that is later used to obtain the VPN. Alternatively, the VPI can directly identify the VPN. The VCI is a temporary value for the leg number. Next, the transcoder performs a level two address translation (step 1102). In a preferred embodiment, this address translation is a VCC address translation that provides an address that is unique within a shelf. In this translation, the VPI includes the destination BTSI slot number and the span number. The VCI contains the CRN, and the CBRH contains the slot identification number of the destination BTSI. At the BTSI, the cell header is processed (step 1104). In processing the cell header, the BTSI verifies that the cell was correctly routed by examining the VPI. The VCI is decoded to obtain the span line number and the DLCI. The DLCI may be contained by direct translation of the VCI or alternatively, the VCI may be used as a pointer to obtain the DLCI.

Although the depicted examples use a BTSI and a transcoder as the source and destination nodes, the same processes employed to route cells may be utilized with other types of source and destination nodes. For example, two BTSIs may form both a source and destination node. An inter-network interface, such as inter-network interface 464 in shelf 456 shown in FIG. 6, may be a source or destination node. Additionally, BID 474 shown in FIG. 6 may be either a source or destination node according to the present invention. Of course, other types of source and destination nodes other than those depicted may be used with the processes of the present invention.

With reference now to FIG. 14, diagrams of records found in TRAMs used in performing address translations to route cells at source nodes are illustrated according to the present invention. Record 1200 is a VPI translation record used in VPI address translations and includes CBRH information that is placed into the header of a cell for routing. Additionally, record 1200 also includes a VPI. Records 1202 and 1204 are VPI and VCI translation records, respectively, used in VCC translations. VPI translation record 1202 provides a VCI page offset that is employed to determine the VCI in translations occurring at source nodes. VCI translation record 1204 is used to provide a VCI and a CBRH in a level two translation at a source node.

Turning next to FIG. 15, a block diagram of a data structure in a TRAM associated with a PPU in a BTSI is illustrated according to the present invention. Data structure 1300 includes a number of records, such as records 1302. Record 1302 includes a VPI portion 1304, a VCI upper portion 1306, and a VCI lower portion 1308 according to the present invention. This data structure is used in a level one address translation. Of course other types or configurations of data structures may be used to contain the information for level one address translations. According to the present invention, a span line number on which a PDU arrives may be used for the VPI, and the DLCI may be mapped to a VCI. Alternatively, the VPI and the VCI may contain the DLCI. If a FUNI interface is employed, direct frame addressing to VPI and VCI mapping may be employed. In another portion, the DLCI may be used as a pointer to an external memory to map values to the VPI and the VCI.

Figure 16:
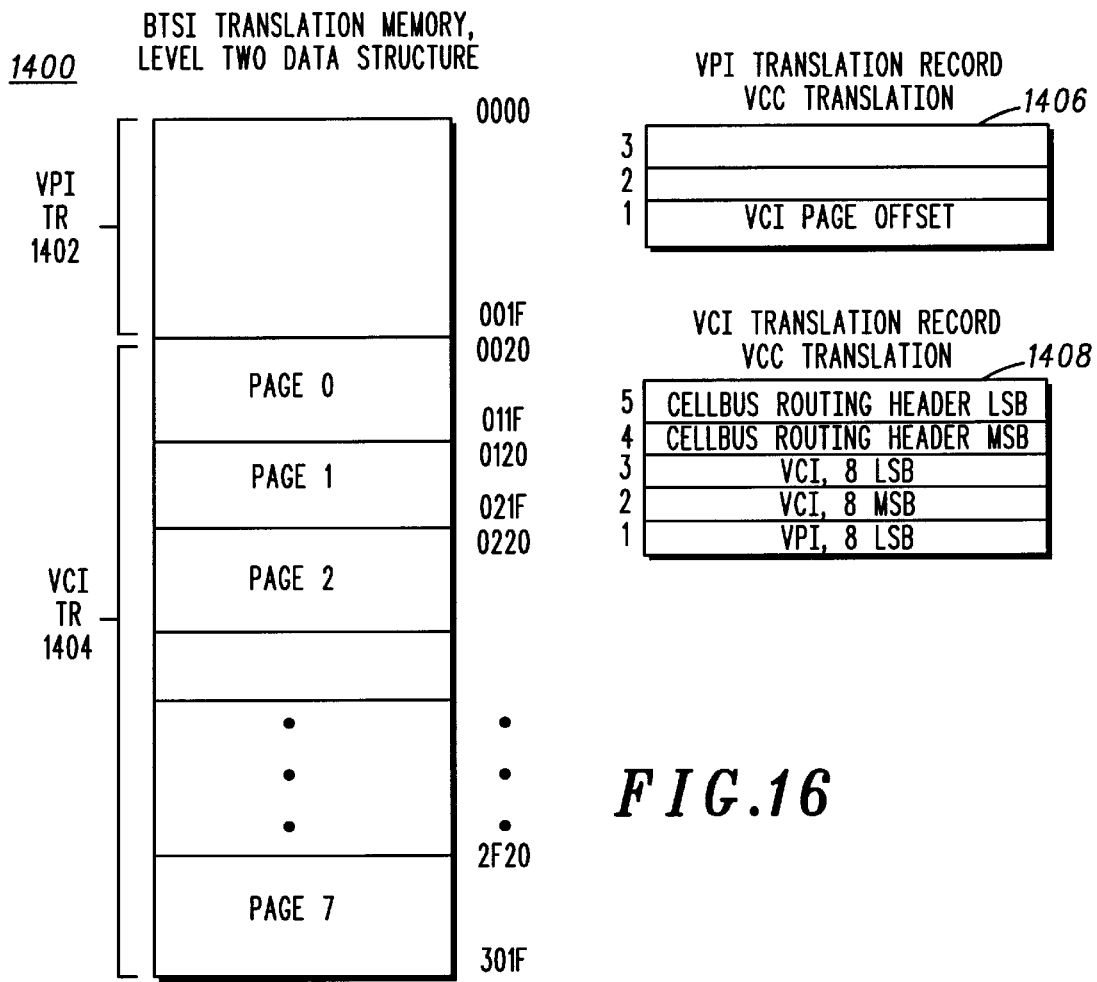
FIG. 16 depicts a block diagram of a data structure in a TRAM associated with a bus interface device (BID) in a BTSI according to the present invention.

Turning next to FIG. 16, a block diagram of a data structure in a TRAM associated with a BID in a BTSI is illustrated according to the present invention. This data structure is used in a level two address translation according to the present invention. Data structure 1400 contains a VPI portion 1402 and a VCI portion 1404. The VPI obtained in the level one address translation is used to obtain a VPI translation record 1406 from VPI portion 1402. VPI translation record 1406 contains a VCI page offset that is employed to determine a VCI translation record. VCI translation record 1408 is obtained by adding the VCI page offset from VPI translation record 1406 to the page and selecting the record at that address. This record contains the CBRH, VCI, and VPI that is placed within the cell prior to transferring the cell to the bus. The CBRH corresponds to a BTC identification number for intershelf paths and to the slot identification number of the node that is to receive the cell in intrashelf paths. The VPI specifies the shelf identification number of the destination shelf in which the transcoder resides. The VCI is a unique identifier for the cell that is set equal to a CRN. When intrashelf routing occurs, the VCI contains the VPN of the DSP in the transcoder.

Figure 17:
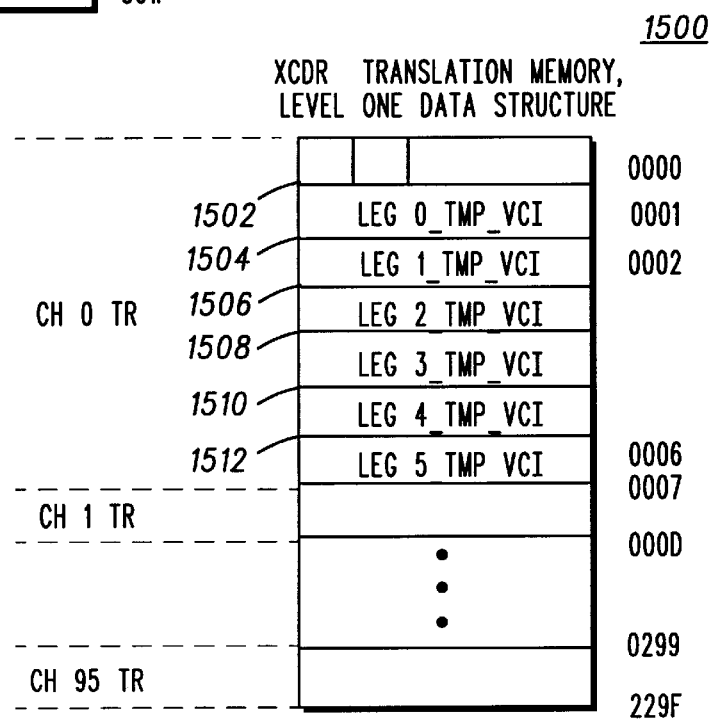
FIG. 17 is a block diagram of a data structure in a TRAM connected to a transceiver located in a transcoder according to the present invention.

With reference now to FIG. 17, a block diagram of a data structure in a TRAM connected to a transceiver located in a transcoder is depicted according to the present invention. This data structure is used in a level one address translation according to the present invention. Data structure 1500 contains records identifying the number of active legs in channels associated with the transcoder. Each active leg indicates the reception of radio signals from a mobile unit at more than one BTS. More than one active leg indicates a SHO in progress. In the depicted example, six translation records 1502–1512 are present for one of six SHO legs for a particular call.

Data structure 1500 is used when the transcoder is the source node and the BTSI is the destination node. The DSP identification number is used to determine an address containing a record to identify a VPI for assignment to a cell. The VCI is assigned as the content of one record associated with a SHO leg. The VCI of each subsequent cell, associated with a call, is set using the next unused record. These VPI and VCI values are unique within the transcoder, but not within the rest of the CBSC.

Figure 18:
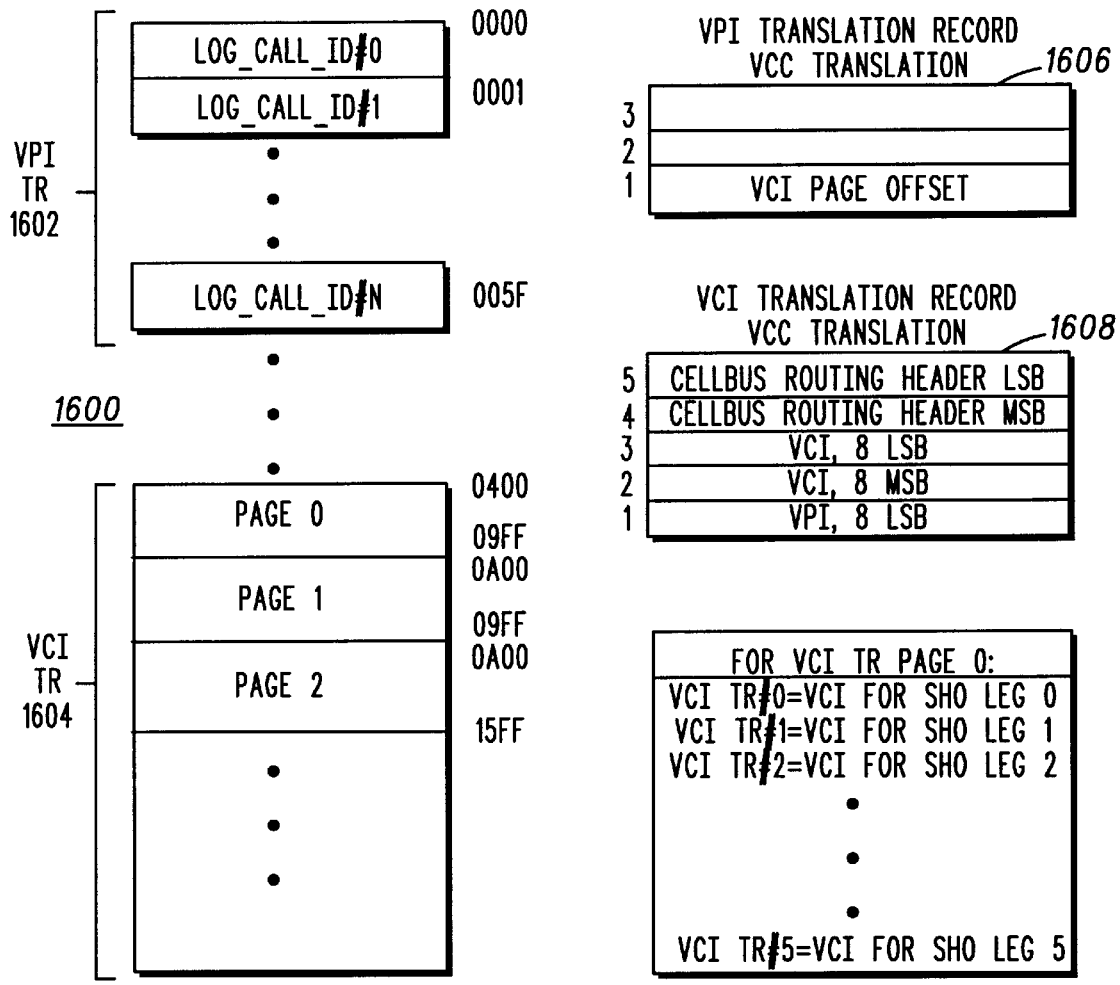
FIG. 18 depicts a block diagram of a data structure in a transcoder TRAM associated with a BID in a transcoder according to the present invention.

Turning next to FIG. 18, a block diagram of a data structure in a TRAM associated with a BID in a transcoder is depicted according to the present invention. This data structure is used in a level two address translation according to the present invention. Data structure 1600 contains a VPI portion 1602 and a VCI portion 1604. VPI portion 1602 is used to obtain a VPI translation record, such as VPI translation record 1606, which contains a VCI page offset. The VPI number also is the page number in VCI portion 1604. The VCI page offset from VPI translation record 1606 is added to the page to obtain an address containing a VCI translation record 1608. This VCI translation record contains the VPI, VCI, and CBRH information that is placed into the header of a cell prior to its transfer to the bus for transport to a destination node. The CBRH directs that cell either to the destination BTSI or to a BTC, depending on whether an intrashelf or intershelf path is to be used to transport cells. With an intershelf path, the VPI indicates the destination BTSI shelf identification number with the VCI containing a CRN that is later used to obtain a DLCI or channel number. With an intrashelf path, the VPI identifies the destination BTSI slot identification number along with the span line number. The VCI includes either a CRN or a channel number.

Figure 19:
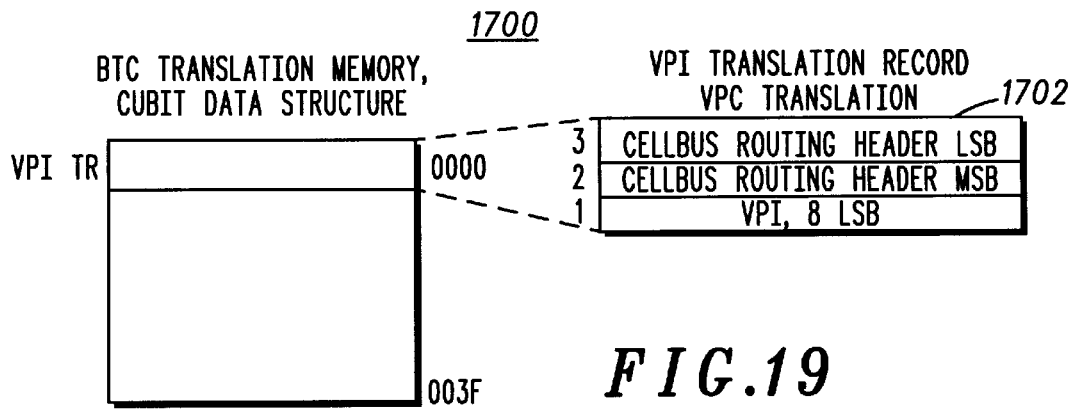
FIG. 19 is a block diagram of a data structure in a TRAM connected to a BID in a bus termination card (BTC) according to the present invention.

Turning now to FIG. 19, a block diagram of a data structure in a BID TRAM of an intermediate node is depicted according to the present invention. Data structure 1700 includes entries for VCI translations in TRAMs for BID-A, BID-B, and BID-C. The VPI of a cell is used to determine an address for a VPI translation record 1702. This VPI translation record includes a VPI and a CBRH. The CBRH is used to direct the cell either to the destination node or to the next BTC in the path to the destination node. The VPI field in VPI translation record 1702 always contains the same VPI used to access this translation record. In other words, the VPI is not changed in the address translation, only the CBRH is replaced in the cell header. The advantage of the static routing according to the present invention is again illustrated, as each incoming cell arriving at a BTC node references the table and is processed according to simple rules to determine the next leg of the route. No exterior "processing" effort is required. That is, the simple look-up translation of the incoming VPI/VCI address retrieves the correct information (new VPI/VCI) automatically, without intervention of any dedicated resource (control processors). The foregoing improvement is the result of statically setting up the memory for later use in routing messages through the ATM network.

With reference now to FIG. 20, a block diagram of a data structure in a BID-Z TRAM is depicted according to the present invention. Data structure 1800 includes VPI translation record portion 1802 and VCI translation record portion 1804. Cells in a destination BTC are routed to the destination node using BID-Z, which uses a VCC address translation to extract a CBRH for the destination node. The VPI is used to obtain a VCI page offset found in VPI translation record 1806. The VCI page offset is used to obtain VCI translation record 1808 from VCI translation record portion 1804. VCI translation record 1808 includes a CBRH to route the cell to the destination node, such as a BTSI or a transcoder. This record also includes a VCI relating the cell to a particular digital signal processor (DSP) or a BTS span channel number and a VPI, which is not used.

Turning now to FIG. 21, a flowchart for setting up paths within a CBSC is depicted according to the present invention. The process begins by identifying source nodes in the CBSC (step 1900). Thereafter, the process identifies destination nodes within the CBSC (step 1902). An unprocessed source node is then selected for processing (step 1904). The process then determines all of the destination nodes for the selected source node (step 1906). A path is selected between the source node and each destination node (step 1908). The process then determines whether additional source nodes are present for processing (step 1910). If additional source nodes are present, the process returns to step 1904. Otherwise, the process then stores routing information identifying the paths within each of the nodes within the CBSC (step 1912) with the process terminating thereafter. This process is initially performed prior to the CBSC beginning to route calls. The process also may be executed in response to adding additional nodes according to the present invention.

The TRAM for each BID is filled using the following rules:
1. If VPI$_{cell}$=Node (N), route to shelf
2. If VPI$_{cell}$=Node (range N), and ≠Node (N), route to intraframe shelf
3. If VPI$_{cell}$=Node (range M) route to interframe shelf, or
4. Else, route to intraframe shelf.
where:
   VPI$_{cell}$ is the VPI of the cell being routed;
   Node N is the node in which the cell is presently located;
   Node (range N) is a node in the same frame as node N; and
   Node (range M) is a node in a frame connected to node N.

In other words, a cell is routed to the shelf when the VPI contains the identifier for the node located on that shelf. If the shelf is connected to another shelf via the interframe ring, the cell is routed to a BID-D for transport along the interframe ring. If the node is located on another frame that is connected to the shelf in which the cell is located, the cell is then routed to a BID-C for transport to that frame. Otherwise, the destination node is located in a shelf in a frame that does not have a direct connection to this particular shelf in which the cell is located. In that instance, the cell is routed to an interframe shelf along the interframe ring to find another shelf that can route the cell to the appropriate frame.

Thus, the present invention provides an improved method and apparatus for routing cells between a source node and a destination node. Under the present invention, a flexible routing system is provided in which a path between the source node and the destination node is determined locally by the source node. The present invention provides the advantage of not requiring intermediate nodes to select a path to the destination node. These paths are preset. Intermediate nodes route the cells to the next node based on the path selected by the source node. Thus, no per-call internode setup is required, resulting in faster call setup. The present invention also provides an advantage in which less maintenance is required due to predetermined routing, which eliminates the need for monitoring real-time system loading or running cost minimization routines with each call.

What is claimed is:

1. A method for efficiently routing a cell in a cell-based switching system having a plurality of nodes including a source node in a first group of nodes, a first-group intermediate node in the first group of nodes, a destination node in a second group of nodes, and a second-group intermediate node in the second group of nodes, wherein each of the plurality of nodes includes an address translation table for storing routing information, the method comprising:
   prior to receiving data at the source node, preconfiguring an address translation table in the first-group intermediate node to define a preconfigured path from the first-group intermediate node to the second-group intermediate node; and
   in response to determining that a cell should be routed from the source node to the destination node:
      configuring an address translation table in the source node to define a path from the source node to the first-group intermediate node and though the preconfigured path to the second-group intermediate node; and
      configuring an address translation table in the second-group intermediate node to define a path from the second-group intermediate node to the destination node.

2. The method for efficiently routing a cell according to claim 1 wherein the cell-based switching system further includes a third group of nodes including a third-group intermediate node in the third group of nodes, the method further comprising:
   prior to receiving data at the source node, preconfiguring address translation tables in the first-group intermediate node and the second-group intermediate node to define a second preconfigured path from the first-group intermediate node through the second-group intermediate node to the third-group intermediate node; and
   in response to determining that a cell should be routed from the source node to a second destination node:
      configuring an address translation table in the source node to define a path from the source node to the first-group intermediate node and through the second preconfigured path to the third-group intermediate node; and configuring an address translation table in the third-group intermediate node to define a path from the third-group intermediate node to the second destination node.

3. The method for efficiently routing a cell according to claim 1 further including the steps of:

constructing a cell with data received at the source node, wherein the cell includes a two part header having a preconfigured path identifier and a destination identifier;

routing the cell from a group of nodes containing the source node to a selected group of nodes using the preconfigured path identifier; and routing the cell within the selected group of nodes to the destination node using the destination identifier.

4. The method for efficiently routing a cell according to claim 1 wherein the step of preconfiguring an address translation table further includes preconfiguring an address translation table in the first-group intermediate node to define a preconfigured path from the first-group intermediate node to the second-group intermediate node during an initialization of the cell-based switching system.

5. A system for efficiently routing a cell in a cell-based switching system comprising:

a plurality of nodes including a source node in a first group of nodes, a first-group intermediate node in the first group of nodes, a destination node in a second group of nodes, and a second-group intermediate node in the second group of nodes, wherein each of the plurality of nodes includes an address translation table for storing routing information;

means for preconfiguring an address translation table in the first-group intermediate node to define a preconfigured path from the first-group intermediate node to the second-group intermediate node prior to receiving data at the source node;

means for configuring an address translation table in the source node to define a path from the source node to the first-group intermediate node and though the preconfigured path to the second-intermediate node in response to determining that a cell should be routed from the source node to the destination node; and means for configuring an address translation table in the second-group intermediate node to define a path from the second-group intermediate node to the destination node in response to determining that a cell should be routed from the source node to the destination node.

6. The system for efficiently routing a cell according to claim 5 wherein the cell-based switching system further including:

a third group of nodes including a third-group intermediate node in the third group of nodes;

means for preconfiguring address translation tables in the first-group intermediate node and the second-group intermediate node to define a second preconfigured path from the first-group intermediate node through the second-group intermediate node to the third-group intermediate node prior to receiving data at the source node;

means for configuring an address translation table in the source node to define a path from the source node to the first-group intermediate node and through the second preconfigured path to the third-group intermediate node in response to determining that a cell should be routed from the source node to a second destination node; and means for configuring an address translation table in the third-group intermediate node to define a path from the third-group intermediate node to the second destination node in response to determining that a cell should be routed from the source node to a second destination node.

7. The system for efficiently routing a cell according to claim 5 further including:

means for constructing a cell with data received at the source node, wherein the cell includes a two part header having a preconfigured path identifier and a destination identifier;

means for routing the cell from a group of nodes containing the source node to a selected group of nodes using the preconfigured path identifier; and means for routing the cell within the selected group of nodes to the destination node using the destination identifier.

8. The system for efficiently routing a cell according to claim 5 wherein the means for preconfiguring an address translation table further includes means for preconfiguring an address translation table in the first-group intermediate node to define a preconfigured path from the first-group intermediate node to the second-group intermediate node during an initialization of the cell-based switching system.

* * * * *